(12) United States Patent
Kergoat

(10) Patent No.: US 8,445,820 B2
(45) Date of Patent: May 21, 2013

(54) COOKING APPLIANCE FOR FOOD PRODUCT

(75) Inventor: Serge Kergoat, Concarneau (FR)

(73) Assignee: Krampouz, Z.A., Pluguffan (FR)

( * ) Notice: Subject to any disclaimer, the term of this patent is extended or adjusted under 35 U.S.C. 154(b) by 215 days.

(21) Appl. No.: 12/918,767

(22) PCT Filed: Mar. 4, 2009

(86) PCT No.: PCT/EP2009/052537
§ 371 (c)(1),
(2), (4) Date: Aug. 20, 2010

(87) PCT Pub. No.: WO2009/112405
PCT Pub. Date: Sep. 17, 2009

(65) Prior Publication Data
US 2010/0326979 A1 Dec. 30, 2010

(30) Foreign Application Priority Data
Mar. 4, 2008 (FR) ...................................... 08 51385

(51) Int. Cl.
*A47J 37/06* (2006.01)
*H05B 3/68* (2006.01)

(52) U.S. Cl.
USPC ......................................... 219/450.1; 99/372

(58) Field of Classification Search
USPC ........................................ 219/450.1; 99/372
See application file for complete search history.

(56) References Cited

U.S. PATENT DOCUMENTS

| 3,068,778 | A | 12/1962 | Majerus |
| 5,129,313 | A * | 7/1992 | Coppier .......................... 99/376 |
| 6,130,416 | A | 10/2000 | Gabbai |
| 6,555,795 | B2 * | 4/2003 | Glucksman et al. ....... 219/450.1 |
| 6,604,519 | B1 | 8/2003 | Bosser |
| 2008/0216669 | A1 * | 9/2008 | Kuo et al. ....................... 99/372 |

FOREIGN PATENT DOCUMENTS

| EP | 0 705 537 | 3/1999 |
| FR | 2 722 674 | 1/1996 |
| FR | 2 726 753 | 5/1996 |
| FR | 2 876 870 | 4/2006 |
| WO | WO2005/107538 | 11/2005 |
| WO | WO 2006/042855 | 4/2006 |
| WO | WO 2007/051294 | 5/2007 |
| WO | WO 2009/112405 | 9/2009 |

* cited by examiner

*Primary Examiner* — Colleen Matthews
(74) *Attorney, Agent, or Firm* — Harness, Dickey & Pierce, P.L.C.

(57) ABSTRACT

This appliance comprises a pair of plates made of a material that conducts heat well which are heated electrically and are hinged to each other, each of these plates having a cooking surface, which two cooking surfaces can be brought toward each other by pivoting one plate onto the other in order to cook a food product which is clamped between them, the rear or non-cooking surface of each of these plates having a depression with a flat base whose area is large; in accordance with disclosure, a heating module whose shape is complementary to that of said depression is fitted into and fixed removably inside the latter, this module being provided with a shielded electric resistor capable of heating said plate and is supplied with electric current.

20 Claims, 3 Drawing Sheets

US 8,445,820 B2

COOKING APPLIANCE FOR FOOD PRODUCT

CROSS-REFERENCE TO RELATED APPLICATIONS

This application is a National Phase Entry of International Application No. PCT/EP2009/052537, filed on Mar. 4, 2009, which claims priority to French Application 08 51385, filed on Mar. 4, 2008, both of which are incorporated by reference herein.

BACKGROUND AND SUMMARY

The present invention relates to a cooking appliance of a food product, which comprises a pair of plates made of thermally conductive material heated electrically and articulated to one another, each of these plates having a cooking surface, the two cooking surfaces being able to be brought together by folding one plate against the other to cook a food product clamped between said plates. The invention has been designed for making an electric waffle iron, especially for professional use. But it may have various other applications, for cooking a range of products.

A traditional electric waffle iron for professional use comprises cast-iron cooking plates, known as "irons", of a generally rectangular shape, whereof the cooking surface has one or more impressions composed of studs in relief and cavities for giving the waffle the preferred configuration. In some models, these plates can be pivoted relative to one another at a flat angle, at 180°, the two cooking plates then being located in a common horizontal plane. In other models, at "90°"', pivoting a plate is done only at a little over a right angle, and the dough is deposited onto the other cooking plate, remaining horizontal. Some appliances are also designed to be able to be returned to the closed state at an angle of 180°, such that the dough can be allocated correctly in the space separating the two plates; this is useful especially for cooking relatively fluid doughs.

In general, the waffle iron comprises a fixed base, or chassis, for example made of stainless steel, on which said plates are mounted and/or articulated. This base can correspond such that each of said plates can be folded back flat on the latter, singly and/or together with the other plate, so as to be supported against said base in a horizontal position by its dorsal face. In other models, a housing containing the electric power and thermal setting is solid with one of the plates; it is connected electrically to each of the heating plates, either directly or by means of a flexible cable which enables free pivoting when the plate in question is opened.

The present invention is applicable to these different models. In known appliances of this kind, the so-called dorsal face, opposite the cooking surface of each of the plates, exhibits a depression (recess) with a flat base of extended surface, inside which is mounted an electric heating resistor. This is generally a flat thin strip made of conductive metal (nickel-chrome, alloy for example) deposited on a thin plate of insulating electric material, usually based on mica. This plate can be interposed between two similar thin insulating plates. It is this multilayer structure which is inserted into the abovementioned depression.

This structure also accommodates a flexible fitting made of thermal insulating material, which covers the mica-based heating structure. The opening of the depression is generally blocked by a closing plate made of sheet metal, fixed by means of screws to the back of the iron. This plate lightly compresses the layer of insulating material for the purpose of applying said multilayer structure with a certain degree of tightness against the wall of the iron to ensure proper heat transfer.

An appliance of this genre has some disadvantages. In use, hot oil or other hot fatty bodies used for applying liquid to the overcooking surfaces have a tendency to infiltrate to the back of the plates and corrode the multilayer structure and the electric resistor, which alters the insulating qualities of the structure and, over time, causes short-circuits. Fatty bodies also impregnate the layer of thermally insulating insert, resulting in its being crushed and deformed over time, such that it loses its insulation capacity and the heating structure is no longer applied correctly or evenly to the back of the iron. Thermal transfer is now poor. Also, dough (more or less liquid) infiltrates the gap between the peripheral edge of the closing plate and the rim of the depression, and this gap can become clogged by dough crust, which is hardly satisfactory in terms of hygiene.

The aim of the present invention is to rectify these difficulties. For this purpose and in keeping with the invention, a heating module of form complementary to that of said depression is fitted and fixed removably inside the latter, this module being provided with a shielded electric resistor for heating said plate when it is supplied with electric current. A shielded electric resistor comprises an electric wire of high resistance, which is embedded in dielectric but thermally conductive insulating material, the whole being housed in a protective tubular sheath, ensuring its tightness.

Due to the removable character of this heating module, it is easy to remove it periodically from the depression, giving free access to the entire dorsal face of the iron, including the depression, which allows for convenient cleaning. The reliability and shelf life of such an appliance are considerably greater relative to those of traditional appliances.

According to other advantageous and non-limiting characteristics of the invention:
    said module has the form of a flat cassette, of minimal thickness;
    said module has a "sandwich" structure comprising, from the base of the depression to the exterior:
    a heat-distribution sheet made of material having good thermal conductivity, for example aluminium;
    said shielded electric resistor;
    a plating sheet of resistance against the sheet heat-distribution sheet;
    a plate of thermally insulating material;
    a closing sheet; these different components being assembled with each other detachably, for example by means of screws;
    said plate made of thermally insulating material has a calibrated and constant thickness
    the appliance comprises a base on which said plates are mounted and articulated about an axis which coincides with their mutual axis of articulation;
    this base corresponds such that each of the plates can be folded back flat on the latter, singly and/or together with the other plate, so as to be supported against said base by its dorsal face, in a horizontal position;
    the base is provided with control and adjustment means of the electric feed of the resistors of each of the plates, these means being connected to each of said modules by flexible cabling which hinders neither pivoting of the plates nor removal of the modules from their depression;
    at least one module is fitted with a temperature probe able to be housed in a receiving groove of complementary form arranged in the base of said depression when the module is fitted in the latter and fixed to the cooking plate;

each of the modules is fixed to the cooking plate by means of screws and is applied with a certain degree of tightness against the base of the depression.

Such an appliance is advantageously intended for cooking flour-based baking dough for making waffles, the cooking surfaces of the plates being provided with impressions adapted for this purpose. Various applications are feasible, for example for cooking slices of meat or fish. Other characteristics and advantages of the invention will emerge from the following description of one possible embodiment of the invention.

BRIEF DESCRIPTION OF THE DRAWINGS

This description is made in reference to the attached diagrams, in which.

DETAILED DESCRIPTION

Figure 1:
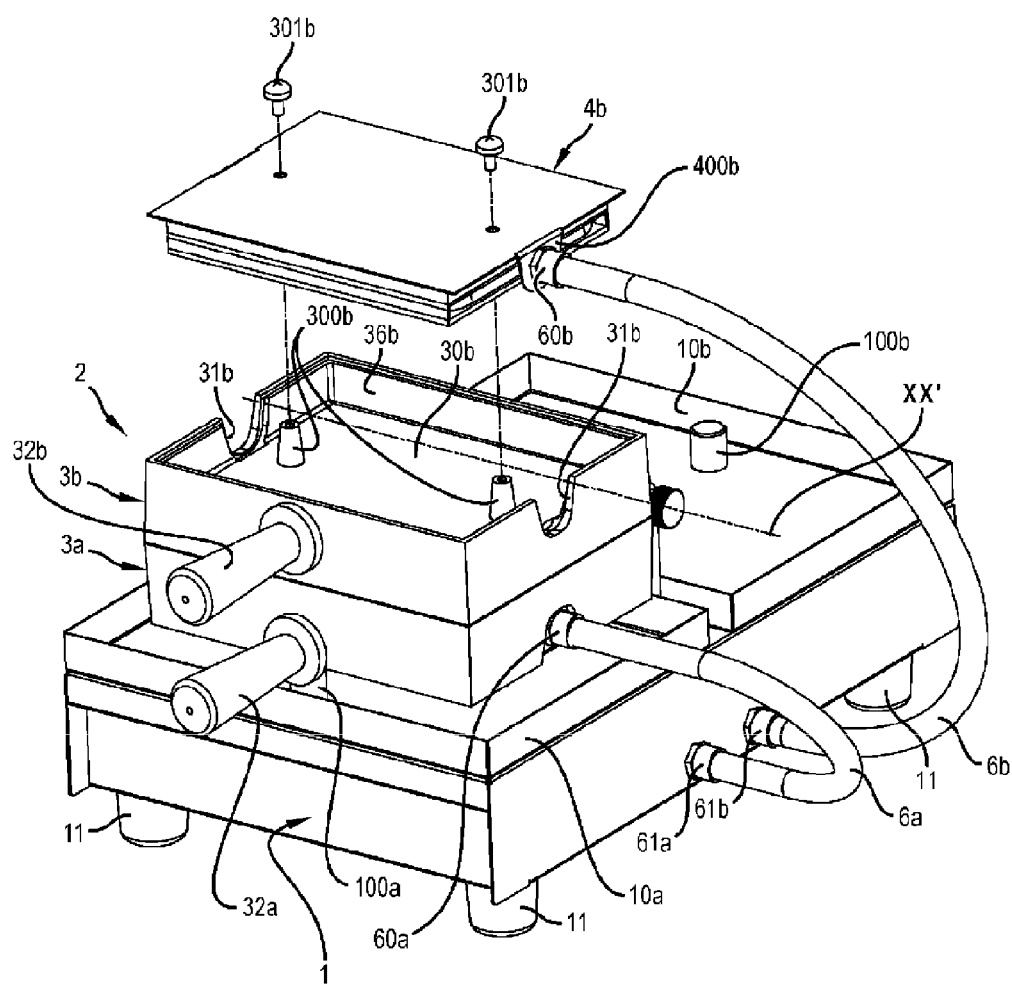
FIGS. 1 and 2 are schematic and perspective views of one possible embodiment of an appliance according to the invention, viewed from different angles.
Figure 2:
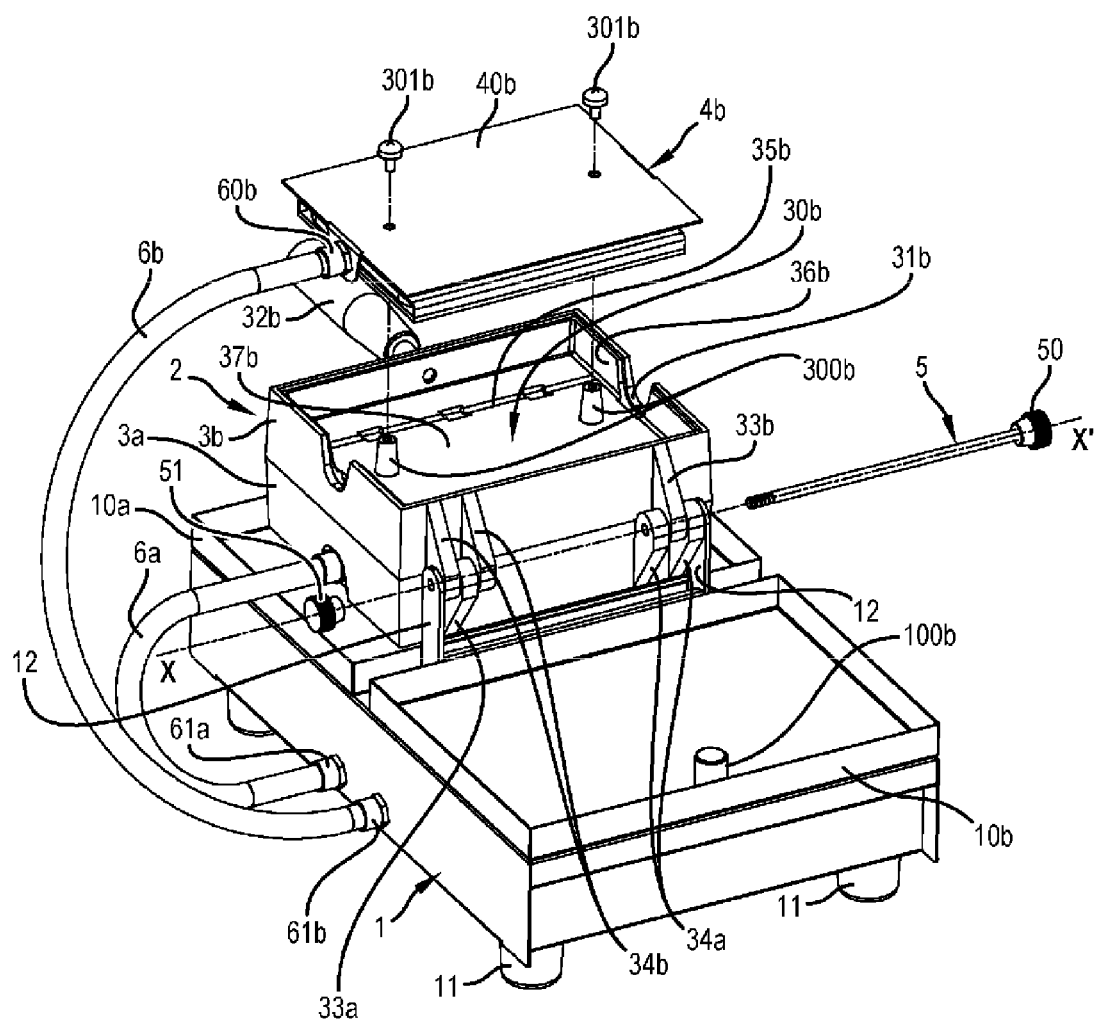

The appliance represented in FIGS. 1 and 2 comprises a base 1 constituted by a parallelepiped rectangular housing, relatively flat, mounted on feet 11 and forming a sort of horizontal working plane. This base supports a pair of identical semi-ensembles, whereof the reference numerals of the components of one have been marked by the index "a" and those of the other by the index In FIG. 1, which represents components likely to belong indistinctly to one another of these semi-assemblies, no index has been used. In its central zone, the upper rectangular face of the base 1 is provided with a pair of flat rods, or feet, 12 penetrated by an orifice acting as passage for a removable rod 5 forming an axis of articulation X-X', of horizontal and transversal direction, that is, perpendicular to the long sides of the base 1. On either side of the feet 12, the upper face of the base 1 supports a pair of identical rectangular containers 10a, 10b with a flat base provided with a peripheral rim of minimal thickness; their size is such that they substantially cover half of the upper face of the base 1.

These containers are removable. Their base is provided with a small cylindrical stud 100a, respectively 100b, pointing up and located on the small axis of symmetry of the container, near the external edge corresponding to a long side of the container (and to a small side of the base). The appliance comprises a cooking mould 2 constituted by a pair of cooking plates, or irons 3a, 3b, identical, rectangular in shape, made of material having good thermal conductivity and high thermal inertia, for example cast-iron. They have mountings 33a-34a and respectively 33b-34b which constitute hinge fittings for ensuring articulation of the irons 3a, 3b to each other at the same time, in the manner of two shells, and on the base 1 (via feet 12), about the axis X-X' embodied by the rod 5. It is evident that the latter has a platen knob 50 and a threaded end portion on which a nut 51 can be screwed.

FIGS. 1 and 2 show the closed mould 2, the cooking surfaces, provided with appropriate impressions (embossed), with irons consequently not visible. The iron 3b is placed above the iron 3a. Arranged at the back of each of these irons 3 is a rectangular depression 30 with a flat base, delimited by a peripheral rim 36. At the level of the central zone of each small side, this rim has a notch 31 approximately semi-circular, whereof the opening is turned out (up, when viewed from the position of the iron 3b). At the level of the central zone of one of its long sides, the rim 36 is pierced by a tapped hole 320 acting as mounting, by screwing, of a handle 32 for opening or closing the mould 2.

As is evident from FIG. 2, a small overall semi-cylindrical groove 35b is hollowed in the base 37b near its long external side, parallel to the latter. This base 37b is solid with a pair of ducts 300b, whereof the axis is perpendicular to its plane, and which each have a tapped axial hole; the function of these ducts is to enable the module 4b to be fixed in the depression 30b by means of a pair of screws 301b, so they are easily detached. The dimensions in length and width of the irons 3 are slightly less than those of the containers 10.

In reference more particularly to FIG. 3, the structure of a heating module 4 adapted to fit in the depression 30 of an iron 3 will now be described. This "sandwich" structure comprises, from the base 30 to the exterior:

sheet of aluminium 71;

a shielded electric resistor 7;

a sheet 72, for example stainless steel, with edges 721 folded back along its long sides, and whereof the function is to plate the resistor against the sheet 71;

a plate 9 made of thermally insulating material, for example based on fibreglass or rock wool, containing a certain volume of air (remarkably insulating) and resisting high temperature;

a closing sheet 40, for example stainless steel having good elasticity.

The sheet 71, the sheet 72, and the plate 9 have rectangular contours of the same dimensions, equal—close to the fitting clearance—to those of the contour of the inner wall of the recess 30. The shielded resistor 7 is an element of circular cross-section, having a generally rectangular shape, substantially homothetic to that of the sheets 71 and 72 between which it is clamped, but with smaller dimensions. Reference numeral 70 designates the electric connection lugs of the resistor 7.

The closing sheet 40 also has a rectangular contour, homothetic to that of the sheets 71, 72 and the insulating plate 9, but with slightly larger dimensions. In fact, this sheet metal is dimensioned such that in the closing position its peripheral edge is supported against the edging of the rim 36 of the depression 30. Also, the lateral edges corresponding to the small sides of the sheet metal 40 are provided with ears folded back at a right angle 400 for inserting into the notches 31, mentioned hereinabove, providing protection and insulation of the inner space of the recess 30 when the module 4 is fitted and fixed therein. One of the ears 400 is fitted with a small sleeve 60 for electric cables to pass through.

Figure 3:
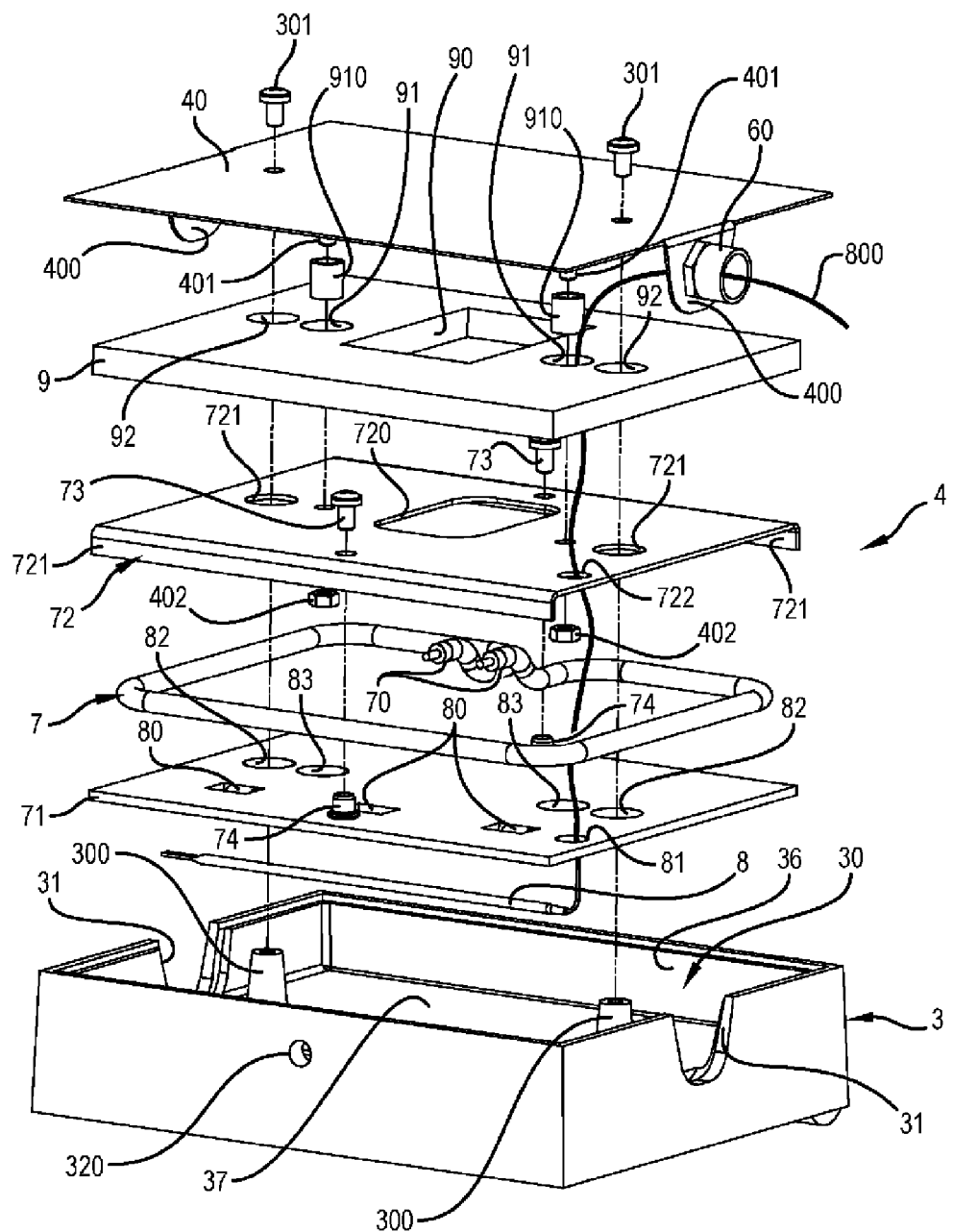
FIG. 3 is an exploded view in perspective showing the different components of a heating module.

In FIG. 3, reference numeral 8 designates a temperature probe. Of a known type, this is a bulb consisting of a rectilinear rod attached to a thermostat (not shown) controlling the temperature, located inside the base 1 by way of a capillary conduit 800. The value of the fluid pressure in the capillary is a function of the temperature of the cooking plate, and controls the thermostat for stopping the electric feed of the resistor 7 beyond a threshold value of given temperature (adjustable). Inversely, feed recommences when the temperature is too low.

The sheet 71 has fitted cutouts 80, with spinning of the material (flat), forming stitching tabs for keeping the probe 8 under the sheet metal. The probe 8 is positioned and dimensioned such that it lodges in the groove 35 provided on the back of the iron when the module 4 is fully inserted into the depression 30, resulting in close contact of the probe with the material of the iron 3, producing precise and faithful measuring of its temperature. Appropriate orifices 81 and 722 pierced in the sheets 71 and respectively 72 create passage for the capillary 800 which emerges from the module 4 via the sleeve 60.

FIG. 3 does not show the electric cabling of the resistor 7 so as not to clutter this figure and not impair clarity. The latter is supplied with electric current by a pair of conductors which also pass through the sleeve 60, pass into appropriate windows 90 and 720 set in the plate 9 for this purpose and respectively in the sheet 72, each connected to one of the lugs 70. These conductors are attached at their other end to an electric feed and control unit situated inside the base 1, and can be controlled in a known manner both voluntarily using ad hoc control elements such as buttons or keys mounted on the façade of the base, and automatically by the thermostat.

The electric cables attaching the base 1 to each of the modules 4a and 4b are lodged in flexible protective sheaths 6a, 6b, sufficiently flexible and long enough not to hinder movements of the irons 3a, 3b during use, nor prevent removal of the modules from their lodging. It is specified that these modules normally remain permanently attached to the base 1 by means of said sheaths. In FIGS. 1 and 2 the reference numerals 61a and 61b designate sleeves for connecting the sheaths 6a and 6b to the base 1.

The different components of a heating module 4 are assembled as explained hereinbelow. An initial sub-assembly is first put together by joining the sheets 72 and 71, sandwiching the shielded resistor 7 between these two sheets. This connection is made using a pair of screws 73 and tightened nuts 74. The folded rims 721 of the sheet 72 ensure protection of the resistor 7 which is somehow encapsulated between the two sheets 71 and 72.

This sub-assembly is then fixed to the closing sheet 40, with intercalation of the insulating plate 9. For this purpose, the inner face of the sheet 40 is joined to a pair of threaded rods 401 (studs, for example) which pass through tubular spacers 910 inserted into holes 91 of the plate 9, and on which nuts 402 are screwed, placed against the inner face of the sheet 72. Holes 83 provided in the sheet 71 provide access to the nuts 402 for a tool such as a socket spanner for example, to tighten or untighten them.

Once the probe 8 has been stapled against the inner face of the plate 71, it remains only to fit the module 4 into the depression 30 and connect it to the iron 3 by means of screws 301. The latter pass through appropriate openings 92, 721 and 82 provided for this purpose in the plate 9, in the sheet metal 72 and, respectively, in the sheet metal 71, and screw into the ducts 300. For screwing purposes the peripheral edge of the closing plate 40 rests against the free edging of the rim 36 of the iron 3, whereas the ears 400 block the lateral notches 31, resulting in a closed and quasi hermetic assembly, protected from spitting and bleeding of dough.

The spacers 910 calibrate the spacing of the sheets 40 and 72 such that the insulating plate 9 can never be crushed, as it consequently remains vented and permanently retains its thermal insulation properties. For screwing purposes "based" on screws 301 in the ducts 300, the rods of these screws are tensed, due to elastic deformation of the zones of the plate 40 located under the screw heads. In this way, the heat-distribution sheet 71 is pushed back and applied with some pressure against the base 37 of the depression 30, ensuring proper thermal transfer of the resistor 7 to the iron 3 by way of this sheet.

During use of the waffle iron, when one iron 3 is folded back flat on the base, it comes to bear against a stop 100 by way of its closing sheet. The height of the stops 100a, 100b is determined so that the relevant cooking surface of the iron is substantially horizontal. The unintended overflow and bleeding of dough are collected in the removable containers 10, which can be emptied and washed when necessary.

Food dough, for example waffle dough, is cooked in the same way as with a conventional appliance. The irons are heated to the preferred temperature, regulated by the thermostat.

When the waffle iron is opened to 180° the necessary lot of dough is placed and spread onto one of the two cooking surfaces. This dough, as a function of the recipe, is more or less fluid. In the event of overflowing, the surplus is collected in the container 10a or 10b which the iron 3a or 3b overhangs, on which the dose is placed.

The other iron is then folded onto the first one by pivoting it at 180° such that the dough is formed between the impressions of the two cooking surfaces now opposite, at the same time as cooking starts. The two irons (closed mould) are then turned over as one in the inverse direction to spread the dough in the cavities of the two opposite impressions. Due to the presence of the heat-distribution sheets 71 and the fact that these are applied with some pressure against the core of the irons 3, the temperature is uniform over the two cooking surfaces, and cooking is perfectly even.

The presence of the thermally insulating plate 9 prevents heat loss and ensures that the external closing sheet 40 is not subject to a substantial rise in temperature which would constitute the risk of burns for the operator. As mentioned earlier, this plate permanently retains the same thickness and correlatively its insulation capacity. When cooking is complete, the waffle iron is opened and the cooked waffle(s) removed.

It is also easy to clean and wash the irons 3a and 3b, if necessary or systematically periodically. For this, each of the irons has to be removed from its heating module 4 (by unscrewing screws 301) and the axis rod 5 has to be pulled out. Each iron can then be cleaned and washed, for example in a dishwasher.

The modules 4a and 4b as such remain adjacent to the base 1 by means of flexible cables 6a and 6b. Because they are in the form of a rectangular and flat cassette, handling is easy. After washing and drying, it is easy to reinstall the appliance via inverse operations. As for the two irons 3a, 3b, the two containers 10a, 10b are identical and accordingly interchangeable, thus avoiding any risk of error during reinstallation. The base 1 is provided with control and adjustment means of the electric feed of the resistors 7 of each of the plates; these means are connected to each of the modules 4 by the flexible cabling 6a and 6b which hinders neither the pivoting of the plates nor removal of the modules from their depressions.

By way of purely indicative example, a heating module 4 has a length of around 185 mm, a width of around 150 mm, and a thickness of around 20 mm. Each 900-W resistor is fed by an alternating current of 230 V. Its maximal temperature is of the order of around 600° C. The temperature at the probe 8, regulated by the thermostat, is in a range of 50 to 300° C.

The same cooking surface is advantageously provided with several impressions, for example two or four impressions for simultaneously cooking two or four waffles. The impressions can be removable and interchangeable, which uses the appliance for making different types of waffles. As mentioned earlier, the invention applies likewise to appliances whereof the plates have mutual pivoting "at 90°" and/or have no fixed base, especially to appliances on which the control and adjustment housing is solid with one of the two plates. In this case, said housing is advantageously mounted directly on the dorsal face of the removable heating module equipping this plate, and is connected to the other plate by a flexible connection.

The invention claimed is:

1. A cooking appliance for a food product, which comprises a pair of cooking plates made of thermally conductive material, which are heated electrically and articulated to one another, each of these plates having a cooking surface, the two cooking surfaces being able to be moved towards one another by folding one plate against the other to cook a food product clamped between them, the so-called dorsal face opposite the cooking surface of each of these plates exhibiting a depression, with a flat base of extended surface, wherein a heating module in the form of a flat cassette, of minimal thickness, complementary to that of said depression, is fitted and fixed removably inside this depression, this module being provided with a shielded electric resistor for heating said cooking plate when it is supplied with electric current, and having a "sandwich" structure comprising, from the base of the depression to the exterior, at least the following components:
   (a) a heat-distribution sheet made of material having good thermal conductivity;
   (b) said shielded electric resistor; and
   (c) a sheet for plating the resistor against the heat-distribution sheet, these components being detachably assembled together;
   wherein said module further comprises an insulating layer located on an opposite side of said resistor from said associated cooking plate, and said associated cooking plate is cast-metal.

2. The cooking appliance of claim 1, wherein said sandwich structure also comprises, outside said sheet plating metal, a plate made of thermally insulating material and a closing sheet.

3. The cooking appliance of claim 2, wherein said plate made of thermally insulating material is at a calibrated and constant thickness.

4. The cooking appliance of claim 1, which comprises a base on which are mounted and articulated said cooking plates about an axis (X-X') which coincides with their mutual axis of articulation.

5. The cooking appliance of claim 4, wherein said base corresponds such that each of said plates can be folded back flat onto the latter, singly and/or together with the other plate, so as to be supported against said base by its dorsal face, in a horizontal position.

6. The cooking appliance of claim 4, wherein said base is provided with control and adjustment means of the electric feed of the resistors of each of the plates, these means being connected to each of said modules by flexible cabling which hinders neither the pivoting of the plates nor removal of the modules from their depression.

7. The cooking appliance of claim 1, wherein at least one module is fitted with a temperature probe capable of being housed in a receiving groove of complementary shape made in the base of said depression when the module fits in the latter and is fixed to the cooking plate.

8. The cooking appliance of claim 1, wherein each of the modules is fixed to the cooking plate by means of screws, and is applied with a certain degree of tightness against the base of the depression.

9. The cooking appliance of claim 1, intended for cooking a flour-based dough for making waffles, the cooking surfaces of the plates being provided with impressions adapted for this purpose.

10. The cooking appliance of claim 5, wherein said base is provided with control and adjustment means of the electric feed of the resistors of each of the plates, these means being connected to each of said modules by flexible cabling which hinders neither the pivoting of the plates nor removal of the modules from their depression.

11. A cooking appliance for a food product, which comprises a pair of cooking plates made of thermally conductive material, which are heated electrically and articulated to one another, each of these plates having a cooking surface, the two cooking surfaces being able to be moved towards one another by folding one plate against the other to cook a food product clamped between them, the so-called dorsal face opposite the cooking surface of each of these plates exhibiting a depression, with a flat base of extended surface, wherein a heating module in the form of a flat cassette, of minimal thickness, complementary to that of said depression, is fitted and fixed removably inside this depression, this module being provided with a shielded electric resistor for heating said cooking plate when it is supplied with electric current, and having a "sandwich" structure comprising, from said base of said depression to an exterior, at least the following components:
   (a) a heat-distribution sheet made of material having good thermal conductivity;
   (b) said shielded electric resistor; and
   (c) a sheet for plating the resistor against the heat-distribution sheet, these components being detachably assembled together;
   wherein said module is entirely received within said depression of said associated cooking plate.

12. The cooking appliance of claim 11, wherein said module further comprises an insulating layer located on an opposite side of said resistor from said associated cooking plate, and said associated cooking plate is cast-metal.

13. A cooking appliance for a food product, the cooking appliance comprising:
   (a) a first cast-metal cooking plate including a cooking surface, an upstanding peripheral rim and a depression defined within the rim;
   (b) a first heating module removably secured to the first cooking plate within the depression;
   (c) a second cast-metal cooking plate including a cooking surface, an upstanding peripheral rim and a depression defined within the rim;
   (d) a second heating module removably secured to the first cooking plate within the depression; and
   (e) at least one hinge coupling the cooking plates together while allowing relative movement therebetween;
   (f) each of the heating modules further comprising:
      (i) a temperature probe adjacent a backside of the cooking surface;
      (ii) a heat-distribution layer located exterior to the probe;
      (iii) a heater located exterior to the heat-distribution layer; and
      (iv) an insulator layer located exterior to the heater.

14. The cooking appliance of claim 13, wherein each of the modules is entirely received within the depression of the associated cooking plate.

15. The cooking appliance of claim 13, wherein the cooking surface of at least one of the cooking plates further comprises a waffle pattern.

16. The cooking appliance of claim 13, wherein for each module, the probe is stapled to the heat distribution layer, and the heater is a single elongated resistor.

17. The cooking appliance of claim 13, wherein each module further comprises:
   a flexible cable, connected to at least one of the heater and the probe, exiting through an aperture in the rim of the cooking plate; and a handle protruding from a side of the rim of each cooking plate opposite the hinge;

the aperture being located in a side of the rim between and perpendicular to the sides attached to the handle and the hinge.

18. The cooking appliance of claim 13, wherein for each module, the insulation layer includes insulating air therein, further comprising a crush-resistant spacer and a fastener extending through a hole in the insulator layer to secure the insulation layer to the backside of the cooking surface.

19. The cooking appliance of claim 13, wherein each module further comprises an outside plate layer located external to the insulating layer, a majority of each layer is flat and parallel to each other in a stacked sandwich arrangement, and each module fits closely within the rim of the associated cooking plate to create a quasi-hermetic assembly protected from fat spitting and bleeding of dough.

20. A cooking appliance for a food product, which comprises:

a pair of cooking plates made of thermally conductive material, which are heated electrically and articulated to one another, each of these plates having a cooking surface, the two cooking surfaces being able to be moved towards one another by folding one plate against the other to cook a food product clamped between them;

a dorsal face opposite the cooking surface of each of these plates including a depression;

a heating module in the form of a flat cassette, of minimal thickness, being removably attached inside said depression of each of said cooking plates, said module further comprising a shielded electric resistor for heating said cooking plate when it is supplied with electric current, and having a "sandwich" structure comprising, from said base of said depression to an exterior, at least the following components:

(a) a heat-distribution sheet made of material having good thermal conductivity;

(b) said shielded electric resistor;

(c) a sheet for plating said resistor against said heat-distribution sheet, these components being detachably assembled together; and removable fasteners tightly attaching each of said modules to said associated cooking plates against said base of said depression therein.

\* \* \* \* \*